Sept. 27, 1949. G. G. RONA 2,483,236
DECORATIVE MATERIAL FOR HANDBAGS
Filed Feb. 4, 1946
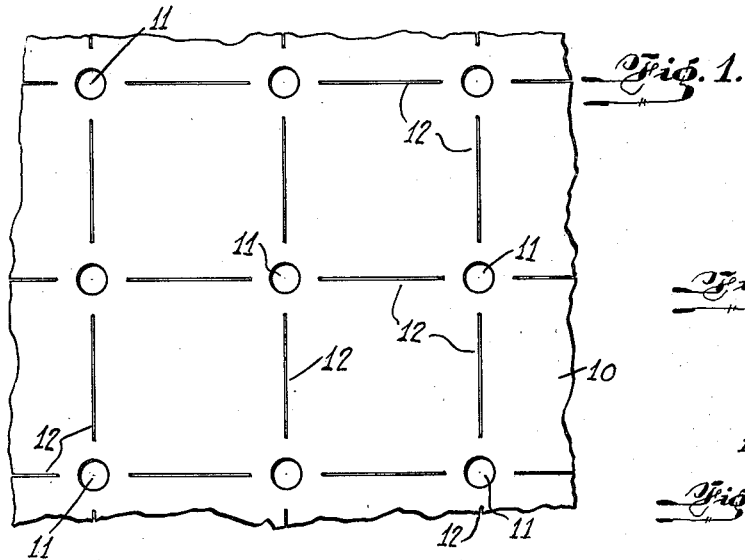
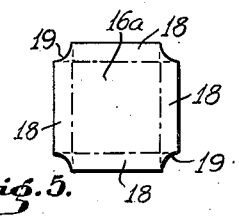
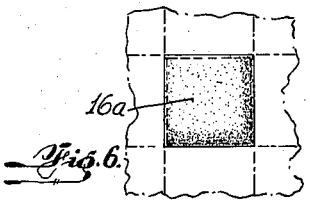
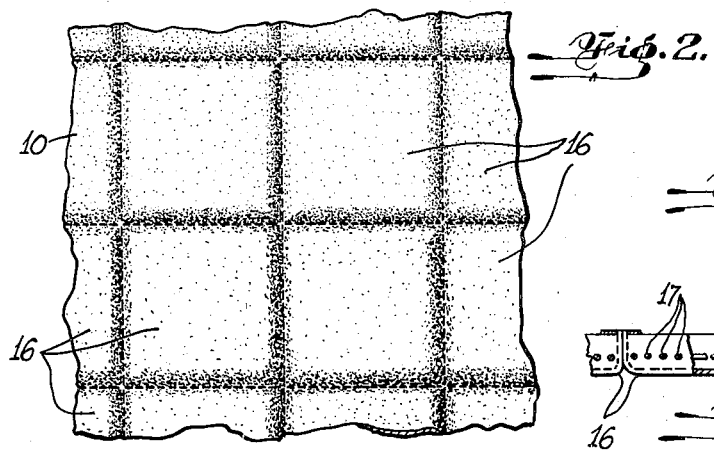
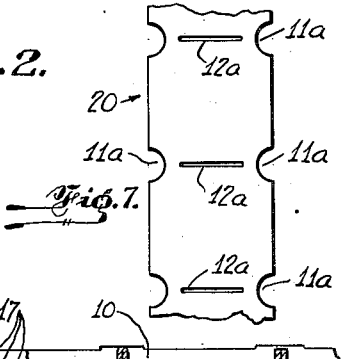
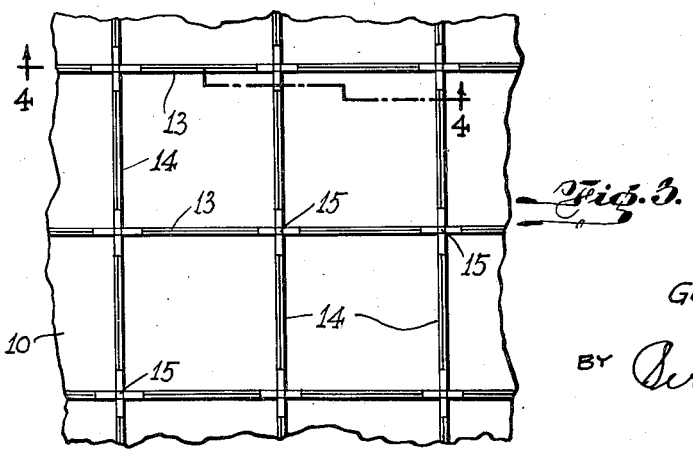
INVENTOR.
GUSTAV G. RONA.
BY
ATTORNEY.

Patented Sept. 27, 1949

2,483,236

UNITED STATES PATENT OFFICE 2,483,236

DECORATIVE MATERIAL FOR HANDBAGS

Gustav G. Rona, New York, N. Y., assignor to Corona Enterprises, Inc., New York, N. Y.

Application February 4, 1946, Serial No. 645,398

6 Claims. (Cl. 41—10)

The present invention pertains to a material adapted for use in making handbags and to a method of making such material and handbags therefrom.

It has become the vogue to make handbags out of plastic material having the appearance of patent leather. This plastic material is a relatively thin and pliable material which has sufficient body and strength to retain curvatures imparted thereto as by perpendicularly arranged sets of rows of stitching. In stitching the plastic material, it is folded first along one axis and then at right angles thereto, it being understood that a plurality of parallel rows of stitching in one direction is completed before the parallel rows of stitching are made at 90° thereto. In this way the surface of the material is "checkered" or provided with contiguous squares or rectangles. Certain difficulties arise in carrying out these operations, with the result that the finished material does not present a uniform or highly attractive appearance. This is due in part to the "crossovers" which have to be made in making the second set of rows of stitching. The material is bunched and bulky at such points on one side of the material and distorted under tension on the other side, so that it is not possible to produce the desired effect of a series of squares or rectangles which have an attractive, convex curvature, free from pulling and flattening at the corners.

My present invention is predicated on the discovery that the wanted effect can be readily produced by first subjecting the material to preparatory perforating and slitting operations and such constitutes one object of the invention.

Another object of the invention resides in perforating and slitting the plastic bag material when an integral sheet is used, prior to carrying out the stitching thereof.

A further object of the invention comprises the fabrication of handbag material, the surface of which is provided with squares or rectangles or other polygonal figures, of uniformly attractive appearance, without bunchiness or cross-overs on one side, and without distortion and flattening at the corners on the other side.

Generally speaking, the invention is directed toward the elimination of the undesirable features and disadvantages of prior constructions and the securing of new and highly useful and unique effects not heretofore obtained, so far as I am aware.

In the accompanying drawing:

Fig. 1 is a fragmentary plan view of a blank of plastic handbag material prepared for use, in the preferred embodiment of the invention.

Fig. 2 is a similar view showing the exposed or "right" side of the finished material.

Fig. 3 is a similar view showing the opposite side of the finished material.

Fig. 4 is a section taken through Fig. 3 along line 4—4 thereof.

Fig. 5 is a plan view of a single unit used in a modification of the invention.

Fig. 6 is a fragmentary plan view showing the "right" side of a fabric made up with the unit shown in Fig. 5.

Fig. 7 is a fragmentary plan view of a strip or ribbon showing an application of the invention.

The plastic material 10 is prepared for use by perforating it at spaced points to produce the apertures 11 and by slitting the material longitudinally and transversely, as shown at 12, the slits terminating short of the apertures. Both the apertures and the slits are arranged in longitudinal and transverse parallel rows. The slits extend between the apertures but are shorter in length than the distances between the apertures. The apertures are preferably circular but it will be understood they may be of any suitable shape.

The next operation is to fold and stitch the material shown in Fig. 1. In this part of the procedure, the material is folded successively along each line of slits and apertures and sewed slightly in from the folded-over edge, on a sewing machine. All the stitching is carried out in one direction before folding and stitching in a direction at right angles to the first rows of stitching. As will be apparent from Fig. 3 in particular, this results in two series of slightly raised ribs, one series 13 running in one direction and the other series 14 running at right angles thereto. At each intersection, a small space 15 exists, which prevents bunching of the material, and which allows for movements of the rib ends in response to flexing movements of the material or the article produced therefrom.

The "right" or exposed side of the material is shown in Fig. 2, from which it will be appreciated that a plurality of contiguous rectangular elements 16 are formed, which are of a convex nature. In other words, the material rises on all four sides from the lines of stitching, with a convex curvature, and rapidly merges into a central portion which, while also convex, is relatively flat. The configuration is approximately that shown in Fig. 4. For convenience and brevity, these elements are hereinafter referred to as pillow-shaped. Typical rows of stitching are designated by the numeral 17 (Fig. 4).

The material so produced may advantageously be formed into handbags or pocketbooks, of various shapes, styles and sizes. The material is preferably glossy like patent-leather, but may have a matte surface, if desired. Any color may be employed which can be given to the material. Black or white material may also be utilized. The "right" or exposed side is attractively and uniformly composed of a plurality of pillow-shaped rectangles, in this case squares, which avoid the pulling, flattening and distorting characteristic of prior materials of this general type.

While it may be preferable to fabricate the decorative material out of an integral sheet of plastics material, it will be obvious that the methods described herein may advantageously be used with any heavy flexible material. For instance, leather or imitation leather may be so fabricated. Besides, while for the purpose of illustration, the fabric has been shown and described as being made up of rectangles, it will be understood that the material can as well be fabricated to present any series of polygonal figures. Instead of using an integral sheet, it may be desirable to use single blanks, a plurality of which may be joined to produce an entire fabricated sheet having pillow-shaped rectangles. Such a unit is shown in Fig. 5, wherein the area embraced by the broken line square would represent substantially the shape of the finished pillow-shaped rectangle 16a, the margins 18 constituting the material which is joined to the margins of adjacent units. The corners 19 are cut away so as to accomplish the same purpose as previously described, with respect to Figs. 1 to 4 inclusive. Or, it may be desirable to fabricate the material of a plurality of differently colored or otherwise dissimilar tapes or bands to produce pleasing and artistic effects. In such case, bands 20 may be used, and provided with the slits 12a therein, as well as the indentations 11a, for avoiding the bunchiness at the cross-over of the seams, as heretofore described. The apertures 11 in Fig. 1, and their counterparts 19 and 11a in Figs. 4 and 7 respectively, need not be circular, as shown. Obviously, these apertures may be of almost any desired shape.

The invention has been illustrated and described as using thread-stitching for producing the desired effects, but applicant does not desire to be so limited as his invention as disclosed herein, may as well be applied and utilized when the uniting of the portions is accomplished in some way other than by thread-stitching, as for instance, by what is called "radio stitching" or by use of adhesives or metal stitches, etc.

Other articles or objects can be produced from the completed material and various modifications may be made so long as they embody the spirit and principles herein set forth. The invention is rather that defined by the subjoined claims.

Having thus described my invention, what I claim as new and desired to secure by Letters Patent, is:

1. A relatively thin and pliable plastic material, one surface of which is composed of rectangular pillow-shaped elements, the marginal edges of each of which are stitched to adjoining elements to provide on the opposite surface, two parallel sets of interrupted ribs disposed at right angles to each other, and the intersections of which have a small space to avoid bunching and crossing-over of the material.

2. A blank of relatively thin, pliable plastic material having a plurality of sets of parallel rows of apertures one set being arranged at right angles to the other, and slits extending between but terminating short of such apertures and arranged to define a plurality of contiguous rectangular elements.

3. A method of making the material defined by claim 3 which comprises perforating and slitting a relatively thin, pliable plastic material to form a blank, successively folding the blank along lines defined by the perforations and slits thus formed, and stitching the folded-over portions slightly inwardly from the edges of the folds, thereby forming contiguous pillow-shaped elements on one surface of the material and sets of parallel interrupted ribs on the other surface, one set of ribs being disposed at right angles to the other set, and the material being concave between ribs.

4. A method of making a decorative material having one surface thereof provided with contiguous pillow-shaped elements defined by stitching, which comprises perforating and slitting a piece of relatively thin, pliable plastic material to provide parallel rows of slits interrupted by perforations, folding the material successively along such rows and stitching the folded-over material.

5. A relatively thin and pliable plastic material, one surface of which is composed of polygonal pillow-shaped elements, the marginal edges of each of which are joined or secured to marginal edges of adjoining elements to provide on the opposite surface, two parallel sets of interrupted ribs disposed at an angle to each other, and the intersections of which have a small space to avoid bunching and crossing over of the material.

6. A method of making the material defined in claim 5 which comprises perforating and slitting a relatively thin pliable plastic material to form a blank, successively folding the blank along lines defined by the perforations and slits thus formed, and uniting the folded-over portions slightly inwardly from the edges of the folds, thereby forming contiguous pillow-shaped elements on one surface of the material and sets of parallel interrupted ribs on the other surface, one set of ribs being disposed at an angle to the other set, and the material being concave between the ribs.

GUSTAV G. RONA.

REFERENCES CITED

The following references are of record in the file of this patent:

UNITED STATES PATENTS

| Number | Name | Date |
| --- | --- | --- |
| 1,328,623 | Fry | Jan. 20, 1920 |
| 2,082,346 | Lovenson | June 1, 1937 |
| 2,188,491 | Wertheim | Jan. 30, 1940 |
| 2,202,673 | Samuelson | May 28, 1940 |
| D. 135,607 | Kalsiher | May 4, 1943 |
| 2,381,860 | Baggott | Aug. 14, 1945 |
| 2,390,021 | Wolf | Nov. 27, 1945 |
| 2,398,118 | Samuelson | Apr. 9, 1946 |